FACSIMILE TELEGRAPH TRANSMITTER

Filed March 27, 1947 2 Sheets-Sheet 1

INVENTOR.
Lucien Devaux
BY
Robert Harding Jr.
ATTORNEY.

FACSIMILE TELEGRAPH TRANSMITTER

Filed March 27, 1947 2 Sheets-Sheet 2

INVENTOR.
Lucien Devaux
BY
Robert Harding Jr.
ATTORNEY.

Patented June 2, 1953 2,640,875

UNITED STATES PATENT OFFICE 2,640,875

FACSIMILE TELEGRAPH TRANSMITTER

Lucien Devaux, Paris, France, assignor to International Standard Electric Corporation, New York, N. Y., a corporation of Delaware Application March 27, 1947, Serial No. 737,499
In France February 7, 1940

18 Claims. (Cl. 178—7.1)

This invention relates to facsimile telegraphic transmitters and particularly to transmitters for systems of telegraphic transmission in facsimile by photoelectric methods.

In systems of transmitting by telegraphy wherein images are sent by photoelectric processes, the message which is to be transmitted is generally placed upon and maintained in contact with the surface of a rotatable drum or cylinder which turns to permit the scanning of the message by means of a point of light that passes over the surface of the cylinder in a tight helix, the lines of which across the face of the message sheet are substantially parallel.

The light reflected by the different parts of the message act upon a photoelectric cell, and the current delivered by the cell is used after transformation and amplification for telegraphic transmission.

An object of the present invention is to construct a scanning system that will send a starting signal sufficient to start the receiver before the scanning of the message begins, that will deliver a signal at the beginning of each line that may be utilized to synchronize the receiver, that will give a terminal signal at the end of the message, and that will incorporate constructional features that will obtain advantages compared to known systems and of which the details will be set forth in the following specification.

Another object of the invention is to make a facsimile telegraph transmitter in which an ellipsoidal reflector throws a light beam upon a white screen placed before the message and having a hole that allows a portion of the ray to illuminate and be reflected from the message, the white surface of the screen or target serving to reflect control rays.

Another object is to impose upon the several rays that may reach the photoelectric cell a distinctive character by interruptions producing different frequencies, and to selectively admit the rays to the cell through shutters coordinated with a portion of a rotary drum upon which the message is mounted.

Another object is to construct apparatus that will emit a starting signal in order to energize the receiving set and to extinguish that energization by oscillations out of phase.

Another object is to indicate the progress of the transmission by a point of light reflected from the lamp that illuminates the scanning drum of a facsimile transmitter.

Another object is to construct an amplifying circuit for the currents that are emitted by the photoelectric cell that will suppress all action outside a certain range and will give maximum current rapidly in response to a selected amount of light, so that the apparatus will be sufficiently sensitive to the message, but will reject stray activation by stray currents.

The description is given with reference to the accompanying drawings which show a preferred construction of the apparatus.

In the drawings, wherein like reference characters refer to like parts throughout the several views, Fig. 1 is a perspective view, partly broken away, of apparatus embodying the principles of the invention;

Figure 1:
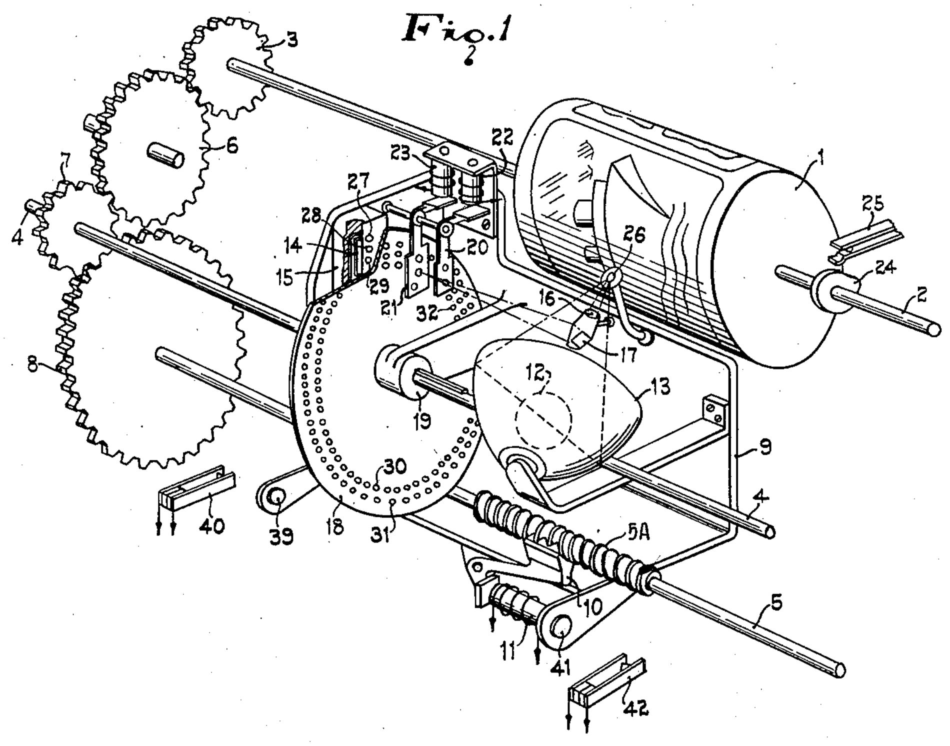

Fig. 1 shows in a schematic and simplified manner the scanning system, including a source of illumination, an objective, a photoelectric cell and the means of controlling the light rays and control rays and electromagnets by interruption. All these elements are mounted on a carriage that travels on rails, not shown, before the cylinder and parallel to a generatrix thereof. The message to be transmitted is wound upon the cylinder and is shown in the particular instance to be the picture of a steamboat. The different parts of the apparatus are shown somewhat spaced in order to facilitate the description.

Figure 6:
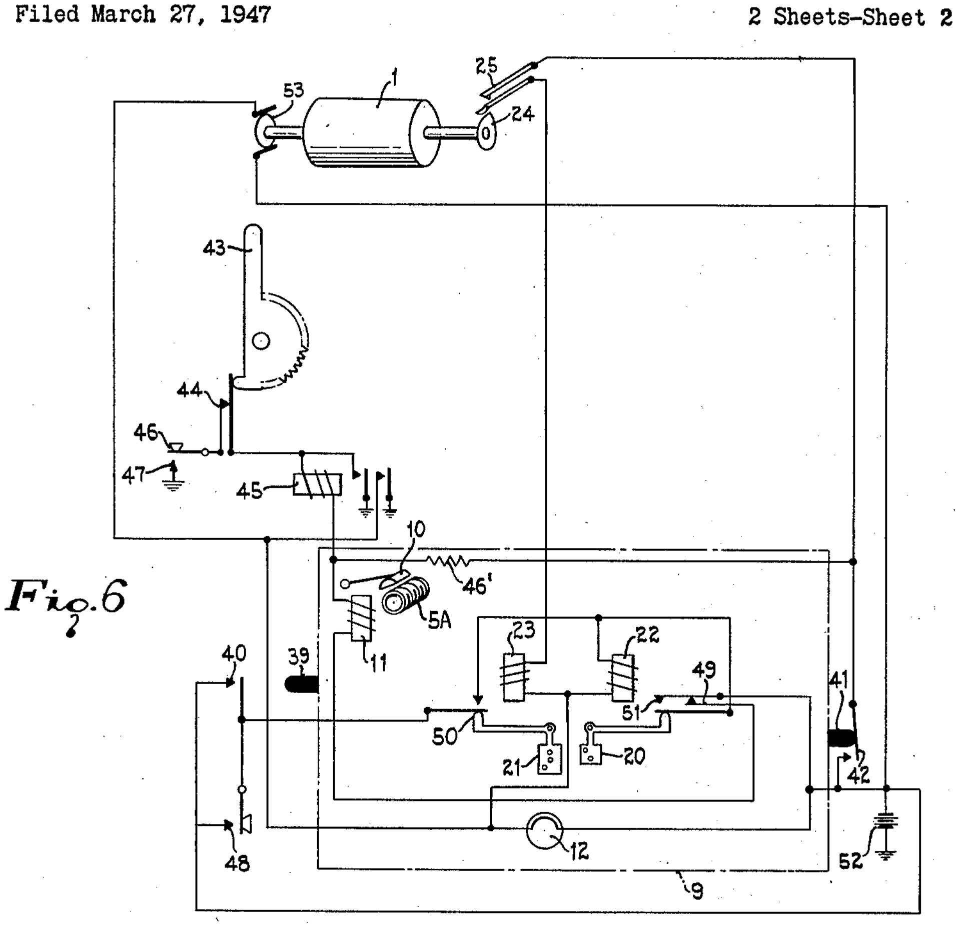
Fig. 6 is a wiring diagram for the operative circuits of the apparatus.

The message is rolled upon a cylinder 1 carried by a shaft 2 which is turned by the motor 53 shown diagrammatically in Fig. 6. The shaft 2 is keyed to a gear 3 which drives a shaft 4 through an idler gear 6. Upon the shaft 4 is mounted the disk 18 by means of a key and slot which permit it to move along the shaft while being turned thereby. The gear 8 is driven by the gear 7 and drives a shaft 5 upon which is a lead screw 5A, the purpose of which is to move the carriage 9 in front of the cylinder for scanning purposes. The carriage 9 is moved by the screw parallel to a generatrix of the cylinder 1. It is engaged with the lead screw by means of a clutch, 10 which is a halfnut, that is brought into engagement with the screw by means of an electromagnet 11.

The carriage 9 carries an electric light 12, a reflector 13, the photoelectric cell 14, which is contained in a box 15, a lens and prism 16, 17, and the interrupter disk 18, which is carried by a support 19 projecting from the carriage. It also carries 2 pivoted shutters 20 and 21 that are controlled by electromagnets 22 and 23.

On the shaft 2 there is keyed a cam 24 that serves intermittently and briefly to close contacts 25 at each revolution of the cylinder. The location of the cam is such with respect to the message that the closing of the contacts occurs at the end of each line and before the beginning of the next.

The light 12 has its filament placed at one focus of the ellipsoidal reflector 13 and the beam is concentrated at the other focus where there is placed a small white target 26 having a central hole. The light that passes through the hole illuminates a small part of the message rolled on cylinder 1 and illuminates it with uniform intensity.

The lens 16 and prism 17 reflect the image of the target on the wall of the box 15 at an area which is provided with three holes in alignment, 27, 28, 29, the image of the target covering these three holes so that the light sent by the target will be directed toward holes 27 and 29, while the reflection from the message is directed toward the hole 28. Consequently, the light reflected by the point that bears upon the message through the hole of the target arrives at the photoelectric cell 14 through the hole 28.

Figure 2:
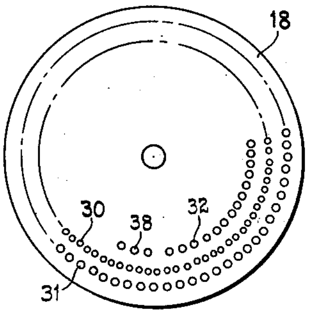
Fig. 2 is a detail of the rotary disk of the apparatus.

The light that arrives at these holes is interrupted by a rotary disk 18, which is driven by the shaft 4. This disk, which is shown in detail in Fig. 2, turns at the same time as the drum 1 and carries three concentric rows of holes. The middle row 30 forms a complete circle and passes before the hole 28 in the box. The number of holes is such that the frequency of the interruptions of the light corresponds to the frequency chosen for the carrier wave, which will be generated by the photoelectric cell 14.

The row of holes 31 also forms a complete circle that passes before hole 27. The number of holes in this row is different from the number in row 30 in order to create a frequency of interruption of the light so different from that created by the row 30 that the frequency of the current generated by the cell 14 when the light passes through the hole 27 is different; this provides the possibility of distinguishing between the two currents by means of a filter in the receiver.

The inner row of holes 32 passes before the hole 29 and does not form a complete circle. The holes in row 32 correspond angularly to those of the outer row 31 so that the current generated by the cell 14 has the same frequency when light passes through hole 29 as when light passes through hole 27, but the holes have only one sector of the disk 18 so that at every revolution a train of waves of current of short duration is generated.

The hole 28, which receives the light from one point of the message, which is interrupted by the range of holes 30, serves to transmit the message by means of a carrier wave of the selected frequency. Only this hole is uncovered during the transmission of each line of the composition.

The hole 29 serves for the sending, at the beginning of the transmission of each line of scansion, of a brief current of synchronization at a different frequency from that of the carrier wave. The hole 27 serves for the sending, at the end of the transmission of a current of the same frequency of the current of synchronization, but of far longer duration, for the object of giving to the receiver a signal that may be used to deliver the inscribed message and to stop the receiver.

Figure 3:
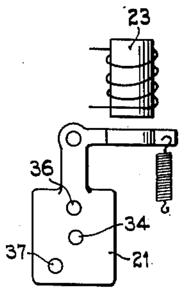
Fig. 3 is a view of one electromagnetically operable shutter.
Figure 4:
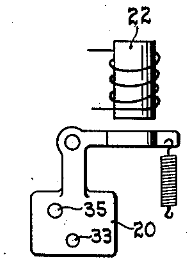
Fig. 4 is a view of a second electromagnetically operable shutter.

The choice of a hole by which the light travels to cell 14 is regulated by two shutters pivotally supported on the carriage and respectively activated by electromagnets 22 and 23. These two shutters are shown apart in Figs. 3 and 4. When in working position they are aligned with the openings 27, 28, 29 that serve to admit light to the three respective areas of the photoelectric cell. When the electromagnets 22 and 23 are not energized, the hole 33 of the shutter 20 and the hole 34 of the shutter 21 are in register, and light passes through them, through the corresponding row of the disk, through hole 28, and activates the cell. When the electromagnet 22 is energized the shutter 20 turns about its pivot so that the light no longer reaches the hole 28, but it does then pass through the hole 35 of the shutter 20, which is in register with the hole 36 of shutter 21 and passes through the hole 27 and the corresponding row of the disk to the cell. When electromagnet 23 is energized the shutter 21 turns about its pivot, the light no longer passes through hole 28, but passes through hole 27 and arrives at hole 29 at a frequency produced by the interruptions of the row of holes 32 in the disk.

From this arrangement it follows that during the transmission of the image, the two electromagnets 22 and 23 must be deenergized; at the beginning of every line the electromagnet 23 functions an instant to uncover the hole 29 before which passes row 32 so as to send a short signal of synchronization that causes the receiver, which is of the start-and-stop type, to start; finally at the end of the transmission of the message, electromagnet 22 functions for a longer period than electromagnet 23 in order to uncover the hole 29 and send a terminal signal of long duration that is used by the receiver to deliver the message and stop the mechanism.

To energize electromagnet 23, the shaft 2 carries cam 24 which at every turn closes contacts 25 interposed in the circuit of the electromagnet. The detail of the circuit is shown in Fig. 6. The cam 24 takes control of the electromagnet 23 a very short time before the range of holes 32 begins to pass before the hole 29 so that the emission of the signal of departure commences exactly when the first hole of the row 32 passes before the hole 29; slight variations in the moment at which the contact 25 is established are therefore without importance, and the signal of departure is always of complete duration.

The row of holes 32 has a characteristic that must be understood. It has been said that at reception the discrimination between the signals and the image signals are made by means of a filter which may be constituted of a resonant circuit, but there results from this uncertainty due to the time of establishment or cessation of the current in the resonant circuit. In order to reduce this uncertainty to a minimum, the start of the receiver is advantageously obtained at the moment of cessation of the current of synchronization, and means are provided at the receiver to kill the resonant circuit after the signal of departure has operated a relay set to reduce the time of extinction, but particularly several periods of a current in phase opposition are sent to oppose the current subsisting in the resonant circuit of the receiver. With this object, after the series of holes 32, which serve to send the starting signal, there are provided several holes indicated at 38 that are offset a half space with respect to the holes of the series 32 and which consequently generate several cycles of current in phase opposition to the current generated by the series 32.

The terminal signal of long duration may be sent when the carriage 9 has arrived at the end of its course. For this purpose the carriage carries a push rod 39 that serves to close the contact 40, which in turn closes the circuit of the electromagnet 22, as more fully explained hereinafter. Another push rod 41 serves to control a contact 42 that closes an instant after the carriage 9 has begun its course and which is included in the circuit of electromagnet 23, which is from then on under the control of contact 25 as hereinafter explained.

The connections between the electromagnets and the contacts are detailed in Fig. 6, which shows schematically the apparatus that have been described hereinabove; a hand switch 43, which is used to turn the cylinder in order to roll the message upon it and which is part of the mechanism described in another application filed March 27, 1947, and bearing Serial No. 737,498, now abandoned, and serves at the end of its motion to close a contact 44; two-contact relay 45; a resistance 46'; a manual starting contact 47; an arresting button 48; working contacts 49 and 51 associated with electromagnet 22; an armature and contact 50 and a working contact 51 associated with electromagnet 23; and a battery 52. The apparatus carried by the carriage are those contained within the dot and dash line. The other apparatus is mounted on the fixed base of the apparatus. The system functions as follows:

The carriage is displaced parallel to a generatrix of the cylinder 1 to scan the message in parallel lines following the usual course. This motion is obtained by means of the endless screw 5A when the light 12 is lit, and which is moved by means of the halfworm 10. The message to be transmitted having been put in place on the cylinder 1 by means of the handle 43, the contact 44 is closed. The operator presses the button 46, closing the following circuit:

From battery 52 through contact 51, contact 49, electromagnet 11, relay 45, contact 44, contact 47, and return. The relay 45 and electromagnet 11 are energized and the relay 45 locks over its left contact so that it keeps the battery circuit closed and its right hand contact closes the circuit that lights the lamp 12. The electromagnet 11 starts the carriage by attracting the armature which is on the pivotally mounted clutch 10. The same contact closes the circuit of the motor 53, which puts the entire apparatus in motion and starts the advance of the carriage.

The electromagnets 22 and 23 being deenergized, the photoelectric cell receives light through the hole 28 from a portion of the message sheet that is not inscribed. Consequently, this emission is not modulated in its intensity and it sends out a carrier wave that is utilized to start the receiver mechanism. The receiver mechanism is described in another application.

After several seconds, the carriage has advanced sufficiently to close the contact 42 and at every turn of the shaft 1 the circuit of electromagnet 23 is closed as follows:

From the battery 52 through contact 42, contact 25, electromagnet 23, and to the ground via the closed right-hand contact of electromagnet 45. The electromagnet 23 operates the shutter 21 so that the light reflected from the target 26 arrives at the cell through hole 29 and the row 32 of the disk, which starts a train of waves constituting the signal for each line of the message. It is particularly to be noted that the contact 42 closes the circuit of resistance 46' in parallel with the electromagnet 11.

When the carriage arrives at the end of its course, push rod 39 mounted on the carriage closes the contact 40, but nothing happens before the contact 25 closes, insuring the complete scanning of the last line of the message. At that moment the following circuit is closed:

From battery 52 through contact 40, contact 50 winding of electromagnet 22, right-hand contact of electromagnet 45 to ground. The electromagnet 22 moves the shutter 20, and the light reflected by the target 26 passes through hole 29 so as to send a signal at the same frequency as the signal of synchronization, but which lasts while the electromagnet 22 is energized. This electromagnet is locked or set by the following circuit:

From battery 52 through contact 51, electromagnet 22, and to the right-hand contact of electromagnet 45 to ground. The circuit of electromagnet 11 is cut off by the separation of contacts 49 and 51, but the circuit of relay 45 remains closed through resistance 46'. The electromagnet 11 releases its armature, and the half-nut of clutch 10 is disengaged from the lead screw 5A. Carriage 9 is then returned to its starting point under the action of a spring, not shown. The terminal signal continues throughout the time of return of the carriage 9, which at the end of its movement breaks the contact 42, whereupon the relay 45 and the electromagnet 22 are deenergized. The light 12 is extinguished and the motor 53 stops.

Figure 5:
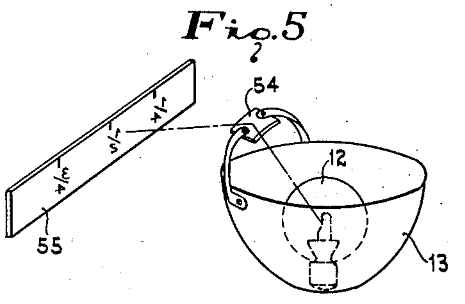
Fig. 5 is a perspective view of a luminous place indicator.

It is advantageous in case of short messages to stop the sending of the message after the apparatus has covered the inscribed portion of the surface, and a means is provided to inform the operator of the state of advancement of the transmission. On the reflector 13 is mounted a small ellipsoidal mirror 54 as shown in Fig. 5. The filament of the lamp is placed at one of the foci of the mirror, and a polished sheet of ground glass is placed at the other focus of the mirror so that a luminous point travelling on the surface of the ground glass shows the relative position of the scanning beam. The ground glass may be graduated in any way, as for instance, in four quarters. When the luminous point arrives at the division where the message ends, the operator may stop the transmission by closing contact 48 manually. That contact is in circuit with the terminal contact 40, and it produces the same action by sending the terminal signal and returning the carriage 9.

Figure 7:
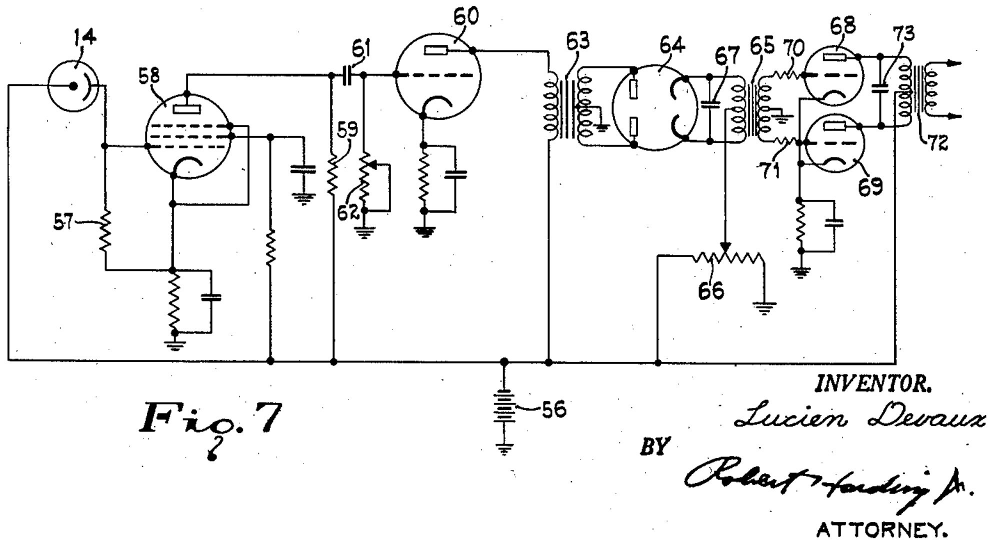
Fig. 7 is a wiring diagram of the circuit that amplifies the emissions of the photoelectric cell.

Fig. 7 shows the diagram of the amplifier circuit used with the photoelectric cell 14 with the object of obtaining a transmission of lines without half-tones. It is desirable in this case, in order to obtain clear transmission of black and white at the receiver, that the amplitude of the current furnished by the transmitter shall not be proportional to the quantity of light returned by every part of the image, but that on the contrary, they remain at their maximum value so that the quantity of light reflected to the photoelectric cell is not less than a certain percentage of the light returned by the white parts of the message and that the currents should be cut off as soon as possible below this minimum. This is particularly important when it is necessary to transmit messages written in pencil, in which the marks are gray. The circuit hereinafter described corresponds to this condition.

The photoelectric cell 14, fed by positive voltage from the battery 56 in series with the resistance 57, is connected to the grid of the pentode 58. The plate or anode of this pentode, supplied through the resistance 59, is connected to the grid of a triode 60 by the condenser 61, a variable resistance 62 serving to connect the grid to ground potential. The condenser 61 is of very small capacity, and the resistance 62 is of small value compared to the impedance of condenser 61 at the frequency employed; on the other hand, the variable resistance 62 is such that the time constant of the circuit formed by the condenser 61 and the resistance 62 at its maximum value is small compared to the frequency of the carrier wave. The coupling circuit gives only a small amplification of the currents delivered by the photoelectric cell, but it answers the requirement of using the derivatives of these currents so as to eliminate the transitory phenomena, or what amounts to the same thing, to eliminate the frequency produced by the image to be transmitted. The triode 60 receives only the carrier wave at an amplitude determined by the illumination of the cell.

The anode or plate of the triode 60 is connected through the primary of a transformer 63, of which the secondary is connected to ground at its middle, and its ends are connected to the two anodes of a double diode 64. The cathodes of this diode are connected to the primary of a transformer 65 of which the mid-part is maintained at a certain positive potential by means of a potentiometer 66, supplied by the battery 56 so as to positively polarize the cathodes of the diode. From this it follows that the current emitted from the cell, after amplification, does not pass at all, except when its crest voltage is superior to the voltage of polarization of diode 64. A small condenser 67 serves to balance the waves.

The secondary of transformer 65, of which the middle is grounded, drives in push-pull the two triodes 68, 69 through two resistances 70 and 71. The ratio of transformation of transformer 65 is such that the triodes 68 and 69 are saturated very rapidly, for instance when the voltage of creation of the currents begins to pass the positive polarization of the anodes of diode 64. It follows that the maximum output of triodes 68 and 69 is attained by means of a certain illumination and remains constant when the illumination increases. The triodes discharge to the primary of a transformer 72, the middle part of which is connected to battery 56. A condenser 73 balances the waves. The secondary of transformer 72 furnishes the carrier wave of the image, which is sent directly on a line, or which may be used for the modulation of a radio transmitter.

An advantage of this invention is in the constitution of a facsimile sending set or transmitter that starts the receiver by sending a signal of definite frequency, but unmodulated, that transmits the message by modulation of the same signal, that picks the message from the surface of the rotating drum and signals the receiver at the start and end of each scanning line accurately, that damps the line-end signal by a brief signal out of phase, that sends a terminal signal of long duration at a different frequency, and that restores the parts of the apparatus to initial position at the termination of the message.

Another advantage is in that the apparatus can be manually restored to initial position at any time.

Further advantages are inherent in the different items of construction set forth in the specification hereinabove.

A further advantage of the invention concerns the circuit by which the emanations of the photoelectric cell are amplified to make the carrier wave that is sent to the receiver. This circuit is such that no transmission occurs of signals below a certain level, whereas in all ranges above that level the signals are sent with a full and uniform intensity. Another advantage of this part of the invention is that it is equally applicable to telegraph and to radio transmission.

Particular advantages are inherent in the details of particular circuits in the amplifier, examples of which are the connection of one circuit to another only through condenser, and the circuit wherein loaded cathodes oppose the transmission of all signals below a particular level.

The novel conceptions set forth herein are many, and it is not feasible to set forth in detail all the advantages that are inherent in them, but it is to be understood that the inventor lays claim to every structure disclosed that contains an inherent advantage.

As many apparently widely different embodiments of the present invention may be made without departing from the spirit and scope thereof, it is to be expressly understood that the invention is not limited to the specific embodiments, except as defined in the appended claims.

What is claimed is:

1. Facsimile telegraphic apparatus comprising a rotatable scanning drum, means to direct a beam of light toward said drum, a perforated reflector interposed between said drum and said light, a single photoelectric cell, means to direct the reflections from said reflector and said drum toward said cell, a revoluble disk having three circles of holes adapted to product different frequencies interposed before said cell, shutters adapted to control the light from said reflector and said drum through said holes of the disk, and means to operate said shutters to selectively admit light to said cell through the circles of said disk.

2. Facsimile telegraphic apparatus comprising a rotatable scanning drum, means to direct a beam of light toward said drum, a perforated reflector interposed between said drum and said light, a single photoelectric cell, means to direct the reflections from said reflector and said drum toward said cell, an obturator interposed before said cell, shutters interposed between said cell and said reflection directing means, and means to operate said shutters to selectively admit light to said cell through said obturator.

3. Facsimile telegraphic apparatus comprising a rotatable scanning drum, means to direct a beam of light toward said drum, a perforated reflector interposed between said drum and said light, a single photoelectric cell, means to direct the reflections from said reflector and said drum toward said cell, means to divide the reflections into rays of different frequency, and means to admit the rays separately to said cell.

4. Facsimile telegraphic apparatus comprising a single photoelectric cell, a rotatable scanning drum, means to reflect light rays from said drum toward said cell, means to direct other light rays toward said cell, means to impose different frequencies upon said rays, and means to energize said cell by said rays selectively.

5. A facsimile transmitting apparatus comprising a single light-responsive device, rotatable message drum means, means to direct a beam of light toward said device, means for interrupting said beam at different frequencies, a first frequency denoting a message part and a second frequency denoting a part adapted to signify an end of a portion of a message, selective shutter means mounted for movement into two positions, in a first position to obstruct a message denoting portion of said beam from admittance to said device, and means under control of said drum means to operate said shutter means to a second position to admit said message denoting portion of said beam to said device.

6. A facsimile transmitting apparatus as claimed in claim 5, wherein said means to operate said shutter means further comprises means operated at a predetermined time during each revolution of said drum, said time corresponding to an end of a message sending period, whereby said beam interrupted at the frequency denoting a message part is cyclically obstructed from said device, and said beam interrupted at the frequency denoting an end of a portion of a message is admitted to said device.

7. A facsimile transmitting apparatus as claimed in claim 5, wherein said shutter means comprises a fixed barrier provided with a plurality of apertures, said barrier disposed between said light beam directing means and said device and adapted to separate said interrupted beam before said device, a pair of movable, apertured shutters, each mounted for selective movement into two positions, the apertures in said shutters adapted to be selectively placed in register with the apertures in said barrier, said drum means adapted to accommodate a message sheet thereon said sheet adapted to affect said beam, and said control means operable in synchronism with the start and the end of portions of said sheet to selectively operate said shutters whereby to distinguish between message and terminal signals.

8. A facsimile transmitting apparatus as claimed in claim 7, wherein the apertures in said barrier are spaced to separately admit each interrupted portion of said beam to different portions of said device, respectively.

9. In a facsimile transmitter, scanning cylinder adapted to receive a message for facsimile transmission, means to reflect a ray of light on the surface of said cylinder in a series of parallel lines forming a tight helix, means comprising a single photoelectric cell to receive the reflected light, means to reflect another ray of light toward said cell from a position adjacent the said ray, means to interrupt said rays at different frequencies, and means to interrupt the first said ray and to pass the said other ray intermittently.

10. In a facsimile transmitter a scanning cylinder and a single photoelectric cell energized by light reflected from a point on said scanning cylinder and from an area thereabout, means to admit different portions of said reflected light to different areas of said cell at different times comprising pivoted shutters, and means to interrupt the portions of light admitted to the different parts of said cell at different frequencies comprising a rotating disk having rows of perforations aligned with said shutters.

11. In a facsimile transmitter having a scanning cylinder and a carriage for photoelectric apparatus movable lengthwise of the cylinder, a scanning device comprising means to cast a beam of light toward said cylinder, a reflector target upon said carriage aligned with said beam and admitting a ray thereof to said cylinder, a single photoelectric cell that receives said light beam reflected from within the outline of said target, a rotatable disk having rows of perforations in said reflected light beam adapted to derive different frequencies from the interruptions of rays of the beam, and shutters in said reflected light beam having holes adapted to be aligned to pass selected rays of reflected light toward said cell.

12. In a facsimile transmitter having a scanning cylinder and a carriage for photoelectric scanning apparatus movable along said cylinder, a scanning device comprising means on said carriage to cast a beam of light toward said cylinder, a reflector target on said carriage aligned with said beam and admititng a ray thereof to said cylinder, a single photoelectric cell that receives the light reflected from within the outline of said target, a rotatable disk carried by said carriage having concentric rows of different perforations adapted to derive different frequencies from the interruptions of the light admitted to said cell, shutter means aligned with said disk and said cell having holes that may be cooperatively aligned to pass a ray of reflected light through a selected row of perforations in said disk.

13. In a facsimile transmitter having a scanning cylinder and a carriage for photoelectric scanning apparatus movable along said cylinder, a scanning device comprising means on said carriage to cast a beam of light toward said cylinder, a reflector target on said carriage aligned with said beam and admitting a ray thereof to said cylinder, a single photoelectric cell that receives the light reflected from within the outline of said target, a rotatable disk carried by said carriage having concentric rows of different perforations adapted to interrupt at different frequencies the light of said beam admitted to said cell, shutter means aligned with said disk and said cell having holes that may be cooperatively aligned to pass a ray of reflected light through a selected row of perforations in said disk, and a circuit responsive to the position of said carriage that intermittently selects rays of light to be admitted to particular areas of said cell by moving said shutter means.

14. In a facsimile transmitter having a scanning cylinder and a carriage for photoelectric scanning apparatus movable along said cylinder, a scanning device comprising means on said carriage to cast a beam of light toward said cylinder, a reflector target on said carriage aligned with said beam and admitting a ray thereof to said cylinder, a single photoelectric cell that receives the light reflected from within said outline of the target, a rotatable disk carried by said carriage having concentric rows of different perforations adapted to interrupt at different frequencies the light beam admitted to said cel and sai shutter means aligned with said disk and sai cell having holes that may be cooperatively aligned to pass a ray of reflected light through a selected row of perforations in said disk, a circuit responsive to the rotation of the scanning cylinder that intermittently selects rays of light to be admitted to particular areas of said cell by moving said shutters.

15. In a facsimile transmitter having a scanning cylinder and a carriage for photoelectric scanning apparatus movable lengthwise of said cylinder, a scanning device comprising means to cast a beam of light toward said cylinder, a reflector target upon said carriage aligned with said beam and admitting a ray thereof to said cylinder, a single photoelectric cell that receives the light reflected from within the outline of said target, a rotatatable disk carried by said carriage having concentric rows of differently spaced perforations before the cell areas adapted to interrupt at different frequencies the light admitted to said cell, one of which contains an offset part, a pair of perforated shutters aligned with said disk and said cell having holes that may be cooperatively aligned to pass a ray of reflected light through a selected row of perforations in said disk, a circuit intermittently energized by means associated with said cylinder to shift a first pair of said shutters to admit light intermittently through one row of disk perforations to one area of said cell, a circuit operatively energized by the carriage at the end of its travel to control the other of said shutters to admit light through another row of perforations in said disk to another area of said cell.

16. In a facsimile transmitter having a scanning cylinder and a carriage for photoelectric scanning apparatus movable lengthwise of said cylinder, a scanning device comprising means to cast a beam of light toward said cylinder; a reflector target upon said carriage having spaced parts admitting a ray of light to said cylinder, light directing means to direct the light reflected from within said outline of the target toward a single cell; photoelectric cell having areas adapted to be exposed to the reflected light; a rotatable disk carried by said carriage having three concentric rows of perforations before the cell areas, one of which is an arc of a circle containing an offset part and the others of which have a difference of spacing causing a difference in frequency in current generated in said cell; a pair of shutters aligned with said disk and said cell having holes that may be cooperatively aligned to pass a ray of reflected light through a selected row of perforations in said disk; a circuit intermittently energized by means associated with said cylinder to shift a first one of said shutters intermittently to admit light through one row of disk perforations to one area of said cell, a circuit operatively energized by the carriage at said end of its travel to control the other of said shutters whereby to admit light through another row of disk preforations to another area of the cell.

17. In a facsimile transmitter having a light, a scanning cylinder, and a carriage for photoelectric scanning apparatus movable lengthwise of said cylinder; a scanning device comprising a reflector target on the carriage having spaced parts admitting light from said light to said cylinder; light directing means to direct the light reflected from within the outline of said target toward a cell; a single photoelectric cell having areas adapted to be exposed to said reflected light; a rotatable disk carried by said carriage having three concentric rows of perforations before the cell areas, one of which is an arc of a circle containing an offset part and the others of which have a difference of spacing causing a difference in the frequency of current generated in said cell; light obstructing and transmitting means aligned with said disk and said cell having holes that may be cooperatively aligned to pass a ray of reflected light through a selected row of perforations in said disk; a circuit intermittently energized by means associated with said cylinder to shift said light obstructing and transmitting means intermittently to admit light through one row of disk perforations to one area of said cell to indicate the end of a scanned line, a circuit operatively energized by said carriage at the end of its travel to shift said light obstructing and transmitting means to admit light through another row of disk preforations to another area of said cell to indicate the end of the scanning operation.

18. In a facsimile transmitter a scanning cylinder, a movable carriage attached to move therealong, a source of light attached to said carriage, a single photoelectric cell, a perforated disk rotatable in the path of light between said cylinder and said cell, a reflector target upon said carriage having spaced parts admitting source from said light to said cylinder; means to direct the light reflected from within the outline of said target toward the cell, and said shutters aligned with said disk and said cell having holes that may be cooperatively aligned to pass a ray of reflected light toward said cell through perforations in said disk.

LUCIEN DEVAUX.

References Cited in the file of this patent

UNITED STATES PATENTS

| Number | Name | Date |
| --- | --- | --- |
| 1,763,482 | Scheppmann | June 10, 1930 |
| 1,789,687 | Ranger | Jan. 20, 1931 |
| 1,897,219 | Schroter | Feb. 14, 1933 |
| 2,098,802 | Finch | Nov. 9, 1937 |
| 2,108,983 | Finch | Feb. 22, 1938 |
| 2,122,974 | Browne | July 5, 1938 |
| 2,147,266 | Percival et al. | Feb. 14, 1939 |
| 2,192,122 | Bowman-Manifold et al. | Feb. 27, 1940 |
| 2,193,875 | Lindenbald | Mar. 19, 1940 |
| 2,255,408 | Carlisle | Sept. 9, 1941 |
| 2,289,948 | Wilson | July 14, 1942 |
| 2,345,501 | Pineo | Mar. 28, 1944 |
| 2,354,571 | Balin | July 25, 1944 |